(12) United States Patent
Song et al.

(10) Patent No.: US 10,567,837 B2
(45) Date of Patent: Feb. 18, 2020

(54) SYSTEM FOR PROVIDING CLOUD-BASED USER INTERFACES AND METHOD THEREOF

(71) Applicant: ALTICAST CORPORATION, Seoul (KR)

(72) Inventors: Moon Kyu Song, Seongnam-si (KR); Woo Hyuck Kim, Hwaseong-si (KR); Hyun Il Jung, Seoul (KR)

(73) Assignee: ALTICAST CORPORATION, Seoul (KR)

( * ) Notice: Subject to any disclaimer, the term of this patent is extended or adjusted under 35 U.S.C. 154(b) by 5 days.

(21) Appl. No.: 15/828,436

(22) Filed: Dec. 1, 2017

(65) Prior Publication Data

US 2018/0160173 A1 Jun. 7, 2018

(30) Foreign Application Priority Data

Dec. 7, 2016 (KR) .......................... 10-2016-0166234

(51) Int. Cl.
| | |
|---|---|
| *H04H 60/32* | (2008.01) |
| *H04N 21/442* | (2011.01) |
| *H04N 21/431* | (2011.01) |
| *H04N 21/45* | (2011.01) |
| *H04N 21/443* | (2011.01) |

(Continued)

(52) U.S. Cl.
CPC ..... *H04N 21/44213* (2013.01); *H04N 21/431* (2013.01); *H04N 21/4312* (2013.01); *H04N 21/4438* (2013.01); *H04N 21/44204* (2013.01); *H04N 21/4516* (2013.01); *H04N 21/47205* (2013.01); *H04N 21/8543* (2013.01)

(58) Field of Classification Search
CPC ......... H04N 21/44213; H04N 21/4312; H04N 21/8543; H04N 21/47205; H04N 21/44204; H04N 21/4438; H04N 21/4516; H04N 21/431
USPC .......................................................... 725/14
See application file for complete search history.

(56) References Cited

U.S. PATENT DOCUMENTS 5,590,219 A * 12/1996 Gourdol .............. G06F 3/04883
 382/187
5,612,719 A * 3/1997 Beernink ............ G06F 3/04883
 345/172

(Continued)

FOREIGN PATENT DOCUMENTS

| KR | 1020160060242 A | 5/2016 |
|---|---|---|
| KR | 1020160060244 A | 5/2016 |

*Primary Examiner* — Michael B. Pierorazio

(57) ABSTRACT

Disclosed are a system for providing cloud-based user interfaces and a method thereof. More particularly, a subscriber terminal device according to the present disclosure may include a control command receiver configured to receive a first control command including description information on a template repeated on a UI (User Interface) screen and a second control command including a replication command for the template from a remote application server; a template generator configured to generate a template the based on the description information on the template; a UI resource acquirer configured to acquire a UI resource based on the second control command; and a UI element generator configured to generate UI elements based on replication of the template and apply the UI resource to the UI element.

13 Claims, 6 Drawing Sheets

(51) Int. Cl.
*H04N 21/8543* (2011.01)
*H04N 21/472* (2011.01)

(56) References Cited

U.S. PATENT DOCUMENTS

| | | | | |
|---|---|---|---|---|
| 6,421,067 B1* | 7/2002 | Kamen | G06F 3/04815 | 348/564 |
| 6,868,551 B1* | 3/2005 | Lawler | H04N 5/44543 | 348/E5.105 |
| 7,373,650 B1* | 5/2008 | Rodriguez | H04N 5/44591 | 348/565 |
| 7,610,555 B2* | 10/2009 | Klein | G06F 3/0481 | 341/176 |
| 7,853,973 B2* | 12/2010 | Chung | H04N 21/84 | 725/135 |
| 7,877,705 B2* | 1/2011 | Chambers | G06F 3/0485 | 715/835 |
| 8,285,334 B2* | 10/2012 | Choi | H04H 60/72 | 455/3.01 |
| 8,302,127 B2* | 10/2012 | Klarfeld | G11B 27/105 | 725/46 |
| 8,850,478 B2* | 9/2014 | Moshiri | H04N 5/44513 | 725/40 |
| 8,904,438 B2* | 12/2014 | Kang | H04N 5/44543 | 725/40 |
| 2003/0117427 A1* | 6/2003 | Haughawout | G01C 21/3682 | 715/710 |
| 2004/0261038 A1* | 12/2004 | Ording | G06F 3/0481 | 715/792 |
| 2005/0060138 A1* | 3/2005 | Wang | G06F 3/018 | 704/1 |
| 2005/0108751 A1* | 5/2005 | Dacosta | G06F 3/0482 | 725/39 |
| 2005/0235321 A1* | 10/2005 | Ahmad-Taylor | H04N 5/44543 | 725/56 |
| 2005/0251821 A1* | 11/2005 | Pina | H04N 21/4126 | 725/39 |
| 2007/0124792 A1* | 5/2007 | Bennett | H04M 1/0233 | 725/133 |
| 2007/0139386 A1* | 6/2007 | Martin | G06F 3/04886 | 345/173 |
| 2007/0165964 A1* | 7/2007 | Wolf | G06F 9/451 | 382/276 |
| 2008/0134250 A1 | 6/2008 | Liu et al. | | |
| 2008/0165141 A1* | 7/2008 | Christie | G06F 3/044 | 345/173 |
| 2009/0144768 A1* | 6/2009 | Nagaraja | H04N 5/44543 | 725/39 |
| 2009/0172512 A1 | 7/2009 | Sakaguchi et al. | | |
| 2010/0238109 A1* | 9/2010 | Cook | G06F 3/0346 | 345/156 |
| 2011/0037851 A1* | 2/2011 | Kim | G06F 3/04847 | 348/143 |
| 2011/0085526 A1* | 4/2011 | Joseph | H04M 1/72533 | 370/338 |
| 2011/0202960 A1* | 8/2011 | Vaysman | H04N 21/84 | 725/41 |
| 2011/0283189 A1* | 11/2011 | McCarty | H04N 5/44543 | 715/707 |
| 2011/0296460 A1 | 12/2011 | Jin et al. | | |
| 2011/0302610 A1* | 12/2011 | Karaoguz | G06Q 20/10 | 725/46 |
| 2011/0321094 A1* | 12/2011 | Kuo | G06F 3/0481 | 725/40 |
| 2012/0131496 A1* | 5/2012 | Goossens | G06F 3/0481 | 715/784 |
| 2012/0151525 A1* | 6/2012 | Demchenko | H04N 21/482 | 725/39 |
| 2012/0224834 A1* | 9/2012 | Chen | H04N 5/765 | 386/293 |
| 2012/0246679 A1* | 9/2012 | Chen | H04N 21/4788 | 725/38 |
| 2012/0278825 A1* | 11/2012 | Tran | G06Q 30/04 | 725/13 |
| 2012/0284753 A1* | 11/2012 | Roberts | H04N 21/41407 | 725/45 |
| 2012/0303476 A1* | 11/2012 | Krzyzanowski | G06F 8/60 | 705/26.5 |
| 2012/0306929 A1* | 12/2012 | Chalkov | G06F 3/0488 | 345/666 |
| 2012/0311444 A1* | 12/2012 | Chaudhri | G06F 3/04883 | 715/716 |
| 2012/0311634 A1* | 12/2012 | VanDuyn | H04N 5/76 | 725/41 |
| 2013/0091525 A1 | 4/2013 | Yoon et al. | | |
| 2016/0100227 A1 | 4/2016 | Lemmons et al. | | |
| 2016/0112737 A1* | 4/2016 | Johnston | H04N 21/44204 | 725/14 |

* cited by examiner

SYSTEM FOR PROVIDING CLOUD-BASED USER INTERFACES AND METHOD THEREOF

CROSS-REFERENCE TO RELATED APPLICATION

This application claims priority under 35 U.S.C 119(a) to Korean Patent Application No. 10-2016-0166234, filed on Dec. 7, 2016 in the Korean Intellectual Property Office, the disclosure of which is incorporated herein by reference.

BACKGROUND OF THE DISCLOSURE

Field of the Disclosure

The present disclosure relates to a system for providing cloud-based user interfaces (UI), more particularly to a system for providing UIs including a UI element generated by a subscriber terminal device according to a control command of a remote application server and a method thereof.

Description of the Related Art

The current broadcasting environment including technology development trends and business trends of pay-TV broadcasters is changing to an Internet-based environment or a hybrid type partially combined with an Internet-based environment.

In addition, consumption patterns for media have diversified due to the emergence of various smart access devices and new advanced technologies, such as HTML5 and UHD, have emerged. Accordingly, there are capital requirements such as purchase of a high-performance Set-Top Box (STB), reorganization of User Interface (UI)/User Experience (UX), development of new services, and upgrade of a head-end system. Such capital requirements are a burden on pay-TV broadcasters.

Pay-TV broadcasters are constantly trying to develop technologies to meet changing trends so as to have a competitive edge over existing pay-TV broadcasters or new media operators such as Over-The-Top (OTT) operators, Google TV, and Apple TV.

Accordingly, pay-TV broadcasters are replacing their existing set-top boxes with high-performance models, adding Internet-based services, and analyzing various viewer needs to add recommendation, search, and personalization functions, are applying multi-screen technology that enables media consumption in various devices, and are investing in photography, editing, encoder, and network equipment to provide UHD-quality video beyond HD.

However, it is difficult to simultaneously replace existing head-end systems and set-top boxes that have been made through large-scale investment, either in financial terms or in terms of time. That is, it took considerable time and cost for the existing broadcasting system to provide real-time broadcast, VoD, and other interactive services, and it is costly to develop a service that can meet customer's demands.

There is a need for a technology capable of solving the problems faced by pay broadcasting companies, breaking away from the existing one-way broadcasting environment, and providing consistent UI/UX to various set-top boxes and media devices utilizing the advantages of the two-way broadcasting environment. In addition, there is a need for a technology capable of providing Internet-based services (social networking, recommendation, search, personalization) and facilitating complex UI/UX change and test for each set-top box model.

According to such need, technologies capable of providing UIs from a cloud-based server to a subscriber device have been proposed. However, due to the nature of a computing process of the cloud-based server, problems such as increased bandwidth and server load for processing the server may occur.

RELATED ART DOCUMENTS

Patent Documents

Korean Patent Application Publication No. 10-2016-0060244 entitled "SYSTEM FOR PROVIDING CLOUD-BASED USER INTERFACES AND METHOD THEREOF," published on May 30, 2016.

Korean Patent Application Publication No. 10-2016-0060242 entitled "SYSTEM FOR PROVIDING CLOUD-BASED USER INTERFACES AND METHOD THEREOF," published on May 30, 2016.

US Patent Application Publication No. 2011/0296460 entitled "METHOD AND APPARATUS FOR PROVIDING REMOTE USER INTERFACE (UI) SERVICE," published on Dec. 1, 2011.

US Patent Application Publication No. 2013/0091525 entitled "METHOD AND APPARATUS FOR PROVIDING CLOUD-BASED USER MENU," published on Apr. 11, 2013.

SUMMARY OF THE DISCLOSURE

Therefore, the present invention has been made in view of the above problems, and it is one object of the present invention to provide a device and method capable of improving system efficiency by reducing a communication message transmitted and received between a remote application server and a subscriber terminal in a cloud-based user interface provision system.

It is another object of the present invention to provide a system and method capable of reducing delay in generating a UI screen and improving user convenience by efficiently controlling UI configuration-related information transmitted and received between a remote application server and a subscriber terminal device in a cloud-based UI provision system.

In accordance with an aspect of the present invention, the above and other objects can be accomplished by the provision of a subscriber terminal device including a control command receiver configured to receive a first control command including description information on a template repeated on a UI (User Interface) screen and a second control command including a replication command for the template from a remote application server; a template generator configured to generate a template the based on the description information on the template template; a UI resource acquirer configured to acquire a UI resource based on the second control command; and a UI element generator configured to generate UI elements based on replication of the template and apply the UI resource to the UI element.

In accordance with another aspect of the present invention, there is provided a remote application server including a control command receiver configured to generate a control command for configuring a UI screen displayed on a subscriber terminal device; a controller configured to control generation of the control command; and a communicator configured to transmit the control command to the subscriber terminal device, wherein the controller, when a template is repeatedly used in the UI screen, generates description information on the template, the control command generator generates a first control command including the description information on the template, and the controller controls the control command generator to generate a second control command including a replication command for the template and information on a UI resource to be applied to the UI element.

In accordance with another aspect of the present invention, there is provided a method of providing UIs of a subscriber terminal device in a cloud-based UI provision system, the method including receiving a first control command including description information on a template repeated in a UI screen from a remote application server; generating a template based on the description information on the template; receiving a second control command including a replication command for the template; acquiring a UI resource applied to a UI element based on the second control command; and generating a UI element based on replication of the template and applying the UI resource to the UI element.

In accordance with yet another aspect of the present invention, there is provided a method of providing UIs of a remote application server in a cloud-based UI provision system, the method including determining whether a template is repeatedly used in a subscriber terminal device; generating description information on the template when the template is repeatedly used; generating a first control command including the description information on the template; generating a second control command including a replication command for the template and information on a UI resource to be applied to the UI element; and transmitting the at least one of the first control command and the second control command to the subscriber terminal device.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION OF THE DISCLOSURE

Hereinafter, embodiments of the present invention are described with reference to the accompanying drawings and the description thereof but are not limited thereto.

The terminology used in the present disclosure serves the purpose of describing particular embodiments only and is not intended to limit the disclosure. As used in the disclosure and the appended claims, the singular forms "a", "an" and "the" are intended to include the plural forms as well, unless context clearly indicates otherwise. It will be further understood that the terms "comprises" and/or "comprising," when used in this specification, specify the presence of stated constituents, steps, operations, and/or devices, but do not preclude the presence or addition of one or more other constituents, steps, operations, and/or devices.

It should not be understood that arbitrary aspects or designs disclosed in "embodiments", "examples", "aspects", etc. used in the specification are more satisfactory or advantageous than other aspects or designs.

In addition, the expression "or" means "inclusive or" rather than "exclusive or". That is, unless otherwise mentioned or clearly inferred from context, the expression "x uses a or b" means any one of natural inclusive permutations.

In addition, as used in the description of the invention and the appended claims, the singular forms "a", "an" and "the" are intended to include the plural forms as well, unless context clearly indicates otherwise.

Further, terms such as "first" and "second" are used herein merely to describe a variety of constituent elements, but the constituent elements are not limited by the terms. The terms are used only for the purpose of distinguishing one constituent element from another constituent element.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Meanwhile, in the following description of the present invention, a detailed description of known functions and configurations incorporated herein will be omitted when it may make the subject matter of the present invention unclear. The terms used in the specification are defined in consideration of functions used in the present invention, and can be changed according to the intent or conventionally used methods of clients, operators, and users. Accordingly, definitions of the terms should be understood on the basis of the entire description of the present specification.

Figure 1:
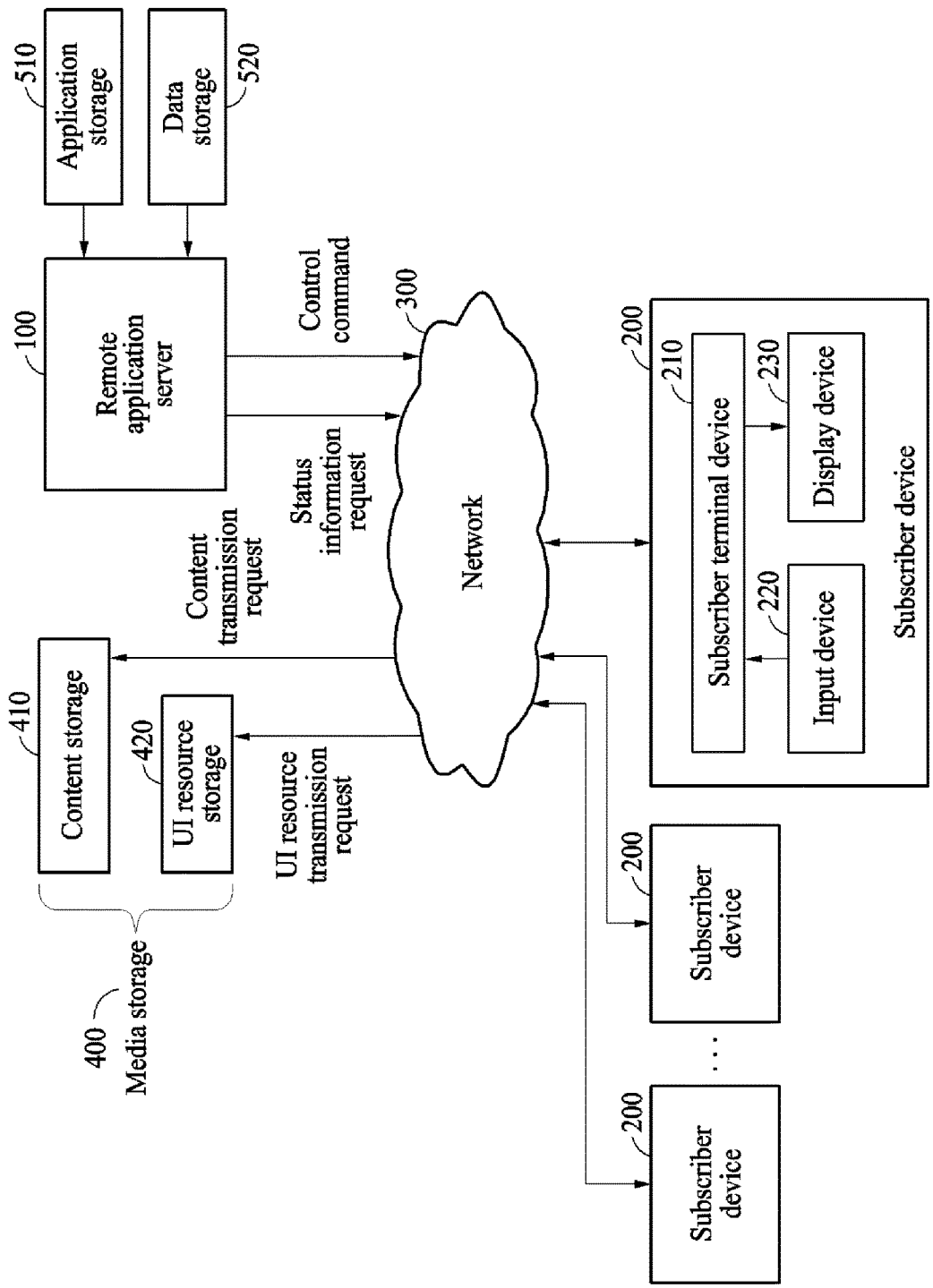
FIG. 1 is a drawing illustrating a cloud-based UI provision system to which embodiments of the present disclosure are applied.

FIG. 1 is a drawing illustrating a cloud-based UI provision system to which embodiments of the present disclosure are applied.

Referring to FIG. 1, the cloud-based UI provision system includes a remote application server 100 and a subscriber device 200.

The remote application server 100 may analyze status information on a subscriber terminal device 210, generate a control command according to the analyzed status information, transmit the generated control command to the subscriber device 200, and control the subscriber terminal device 210 based on the control command or control rendering for at least one of content and a UI resource in the subscriber terminal device 210.

The remote application server 100 may collect status information on the subscriber terminal device 210 in the subscriber device 200 through the network 300, and may generate a control command for controlling rendering of at least one of content and a UI resource in the subscriber terminal device 210 from the collected status information.

In addition, the remote application server 100 may generate a control command for controlling a function of the subscriber terminal device 210 per se.

The remote application server 100 transmits the generated control command to the subscriber device 200 through the network 300.

Here, the status information may be information associated with the subscriber terminal device 210 enabling the subscriber terminal device 210 to perform a specific function by a control command from the remote application server 100.

For example, the status information may include at least one of resolution information and display screen rotation information of a display device 230 interworking with the subscriber terminal device 210, information on a device such as an input device 220 interworking with the subscriber terminal device 210, and service subscription information.

The status information is generated from the subscriber terminal device 210 along with session connection information upon session connection between the remote application server 100 and the subscriber terminal device 210 to be transmitted to the remote application server 100, and is generated from the subscriber terminal device 210 in correspondence with user input to be transmitted to the remote application server 100.

The remote application server 100 may be a head-end system or a cloud-based media provision server, may receive an application for providing a service from an application storage 510, and may receive data, such as subscriber information, media information, or social network-associated information, from the data storage 520.

The subscriber terminal device 210 in the subscriber device 200 performs a function thereof according to a received control command, or receives at least one of content and a UI resource from a content storage 410 and a UI resource storage 420, which are separated from the remote application server 100, through the network 300 to perform rendering.

For example, the subscriber terminal device 210 receives a control command from the remote application server 100, and requests transmission of media, such as content and a UI resource, to a media storage 400 based on the received control command. The media storage 400 may include the content storage 410 and the UI resource storage 420 depending upon a type or shape of stored media.

In particular, the subscriber terminal device 210 requests transmission of a content to the content storage 410 based on the received control command, requests transmission of a UI resource to the UI resource storage 420 to receive content from the content storage 410, and receives the UI resource from the UI resource storage 420.

Subsequently, the subscriber terminal device 210 performs rendering of at least one of the received content resource and UI resource based on the control command received from the remote application server 100.

The UI resource may be implemented using at least one of a web page, a bitmap for an application, and a graphic primitive for an application.

According to an embodiment, the UI resource may include a business service and a user interface receiving input of a user command for controlling the subscriber device 200 from the outside.

The subscriber device 200 may include the subscriber terminal device 210, the input device 220, and the display device 230, and, as illustrated in FIG. 1, at least one subscriber device 200 may be present.

The subscriber terminal device 210 of the present disclosure may be, without being limited to, an electronic device equipped with a wired/wireless communication module, such as a set-top terminal (STT), a set-top box (STB), a communication terminal, a PC, a mobile communication terminal, a smartphone, a notepad, a PDA, or a tablet PC, or a terminal device capable of connecting to and communicating with at least one of the remote application server 100, the content storage 410 and the UI resource storage 420 through the network 300.

The subscriber terminal device 210 may receive an interaction-based user input based on bidirectionality for a content resource and a UI resource rendered and supplied through the display device 230 from the input device 220.

For example, the user input may include various signals such as a stream request, session initialization, and a clickstream.

The subscriber terminal device 210 may directly correspond to a user input to perform rendering for a resource, without depending upon a control command from the remote application server 100, according to a type of a user input received through the input device 220.

For example, when a user input is reprocessed in accordance with a resource state provided to a current user, status information transmission to the remote application server 100 may be unnecessary during reprocessing of a resource. That is, the subscriber terminal device 210 may correspond to a user input received through the input device 220 to perform direct processing of a resource.

The display device 230 may be a device providing a visual or auditory content resource or UI resource, such as a television, a computer monitor, a communication monitor, or a smartphone display, to a user.

The content storage 410 may store and maintain content such as video content, audio content, a real-time TV broadcast program, an on-demand program, SNS information, a chat message, a product, and an application.

The content storage 410 may store a content resource to which a content resource or specific protocol of a format corresponding to a specific protocol, such as an MPEG-2 transport packet, MPEG-4, or DVB, is not applied.

In the case of real-time broadcast content, the remote application server 100 may control such that the content storage 410 acquires the broadcast content, partitions the acquired broadcast content in a predetermined manner, and stores the partitioned broadcast content. In this case, the content storage 410 may separately store and manage broadcast schedule information to acquire and store broadcast content.

For example, the remote application server 100 analyzes status information on the subscriber terminal device 210 and, when the analyzed status information is a reception standby state of partitioned and stored broadcast content, the remote application server 100 generates a control command for transmitting the partitioned and stored broadcast content and transmits the partitioned and stored broadcast content to the subscriber terminal device 210.

The subscriber terminal device 210 having received the control command may transmit a transmission request of the broadcast content to the content storage 410 based on the control command, and the content storage 410 may extract at least one content partition suitable for a corresponding request after searching additional data for the partitioned content, may synthesize the extracted at least one content partition to process as user content, and may transmit the processed content to the subscriber terminal device 210.

Here, the content storage 410 may transmit a corresponding content to the subscriber terminal device 210 or another client device (not shown) by downloading or streaming.

In addition, the content storage 410 may store at least one of broadcast content, content partition, and user content in a cloud storage space, and may also continuously provide content such that continuous content playback ("N-screen service") among a plurality of client devices held by a user is possible.

To accomplish this, the remote application server 100 or the content storage 410 may separately store and manage content playback history for each client device.

Figure 2:
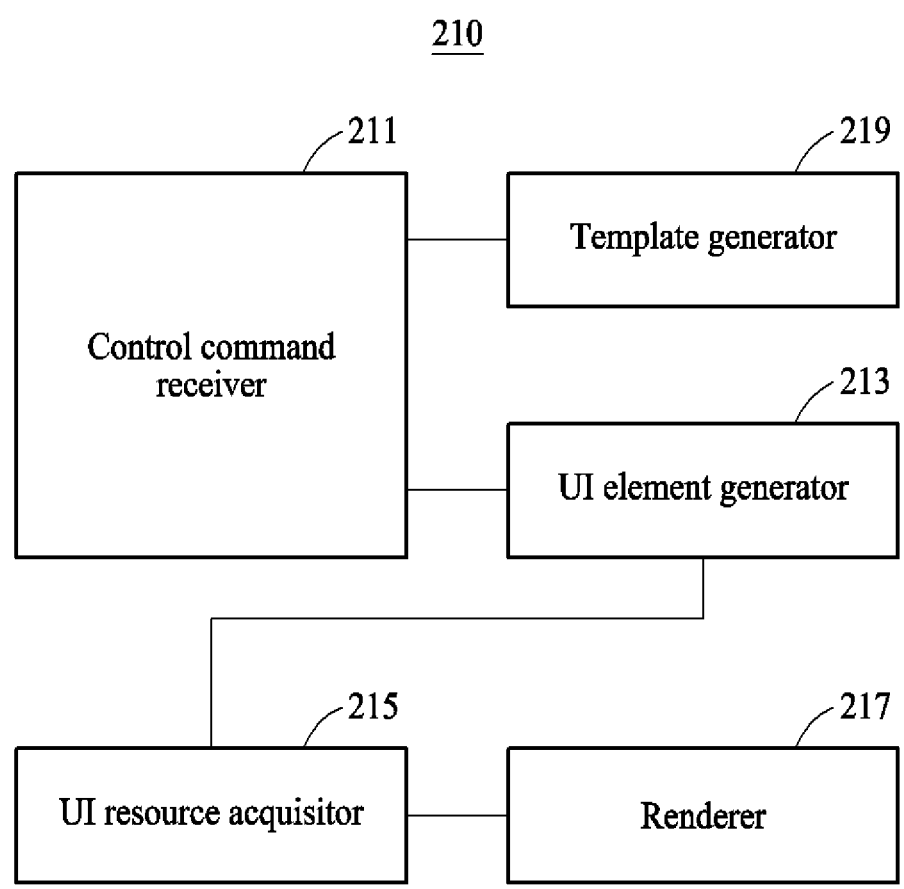
FIG. 2 is a drawing illustrating a configuration of a subscriber terminal device according to an embodiment.

FIG. 2 is a drawing illustrating a configuration of a subscriber terminal device according to an embodiment.

Referring to FIG. 2, the subscriber terminal device 210 includes a control command receiver 211, a UI element generator 213, a UI resource acquirer 215, and a template generator 219. In addition, the subscriber terminal device 210 may further include a renderer 217.

The control command receiver 211 receives at least one control command to configure UIs from the remote application server 100.

The control command receiver 211 receives a control command including description information on a UI element necessary for generation of a UI element to be included in UIs.

Here, a subscriber terminal device 310 may configure UIs using description information on a UI element and UI resource information included in a control command.

The control command may include description information on a UI element, and the description information on a UI element may include information for describing a format of the UI element.

Accordingly, the expressions "information for describing a format of a UI element is included in description information on the UI element" and "description information is included in a control command" may be used in the same meaning in the specification.

The subscriber terminal device 210 may generate a UI element using description information on a UI element, and when a UI resource information is included in the description information on the UI element, may acquire a corresponding UI resource to apply the acquired UI resource to the UI element.

For example, when a UI resource to be applied to the UI element is a poster image and the poster image has been stored in the UI resource storage 420, the subscriber terminal device 210 may acquire the poster image from the UI resource storage 420 to render a UI element including the poster image.

The control command receiver 211 receives a first control command including description information on a template repeated in a UI screen from the remote application server. Here, the first control command may include a command requesting template generation based on the template description information.

In addition, the control command receiver 211 receives a second control command including a replication command for the template.

The template generator 219 may generate a template based on the description information on the template.

The UI element generator 213 generates a UI element based on description information on the UI element included in the control command.

In addition, the UI element generator 213 generates a UI element based on replication of the template and applies the UI resource to the UI element.

The UI element generator 213, when a UI resource is necessary to generate a UI element, may notify to the UI resource acquirer 215 that UI resource acquisition is necessary.

Here, when a template of a UI element is repeated in a UI screen provided to a user through the display device 230, the remote application server 100 may transmit the second control command including a replication command of the template to the subscriber terminal device 210.

Meanwhile, the first control command and the second control command transmitted the remote application server 100 to the subscriber terminal device 310 may be included in one control command and may be transmitted as one control command.

In other words, description information on the UI element included the control command may include description information on a template and description information on the UI element. Here, the description information on the UI element may include a replication command for the template.

The description information on the template may include information on sizes of template components, positions of template components, attributes of a UI resource, and the like.

The UI element generator 213 may apply the UI resource to the attribute information on the UI resource.

Here, the second control command may include information on the number of generated UI elements. For example, the information on the number of generated UI elements may refer to a repeated number of a template replication command. In other words, when a template is repeated in a UI screen several times, the second control command may include information on the number of generated templates.

Accordingly, the second control command may include information on the number of generated UI elements, UI resource information to be applied to each of UI elements when a plurality of UI elements is generated, and screen coordinate information on each of the UI elements.

Here, the screen coordinate information refers to a position of a UI element arranged on a UI screen.

Figure 6:
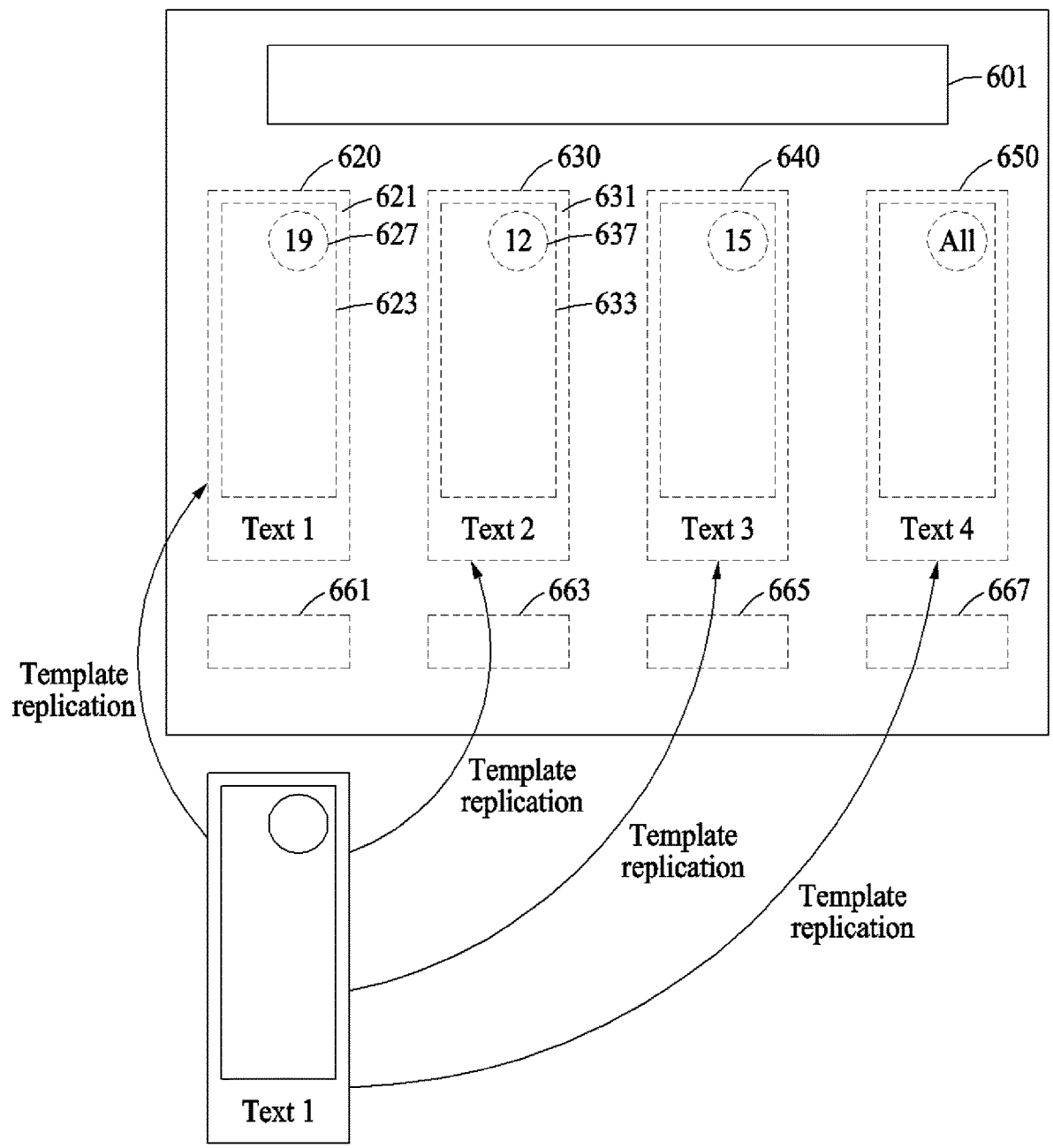
FIG. 6 illustrates an embodiment of a UI screen displayed on a display device to describe a method of providing UIs according to an embodiment.

Description information on the template included in the control command, a format of the UI element, information on the number of the generated UI elements, and the like are described in more detail through particular embodiments with reference to FIG. 6.

The UI resource acquirer 215 acquires a UI resource to be applied to the UI element based on the second control command.

The renderer 217 may configure a UI element using a control command and a UI resource, and may provide a UI screen to the display device 230.

The renderer 217 may render each of a plurality of UI elements to be positioned at an appropriate position of a UI screen that is provided to a user based on screen coordinate information on each of the UI elements.

Although not illustrated in FIG. 2, the subscriber terminal device 210 may further include a controller including at least one processor.

Here, the control command receiver 211, upon receiving description information on a template or a third control command designating a template generated according to the description information on the template as a local UI, may transfer the third control command to the controller.

The controller checks a memory capacity allocated to the local UI, may store description information on the template or an image generated according to the description information on the template in a memory when the memory capacity allocated to the local UI is equal to or larger than a predetermined value, and may transmit a return message to the remote application server when a memory capacity allocated to the local UI is not larger than a predetermined value.

Figure 3:
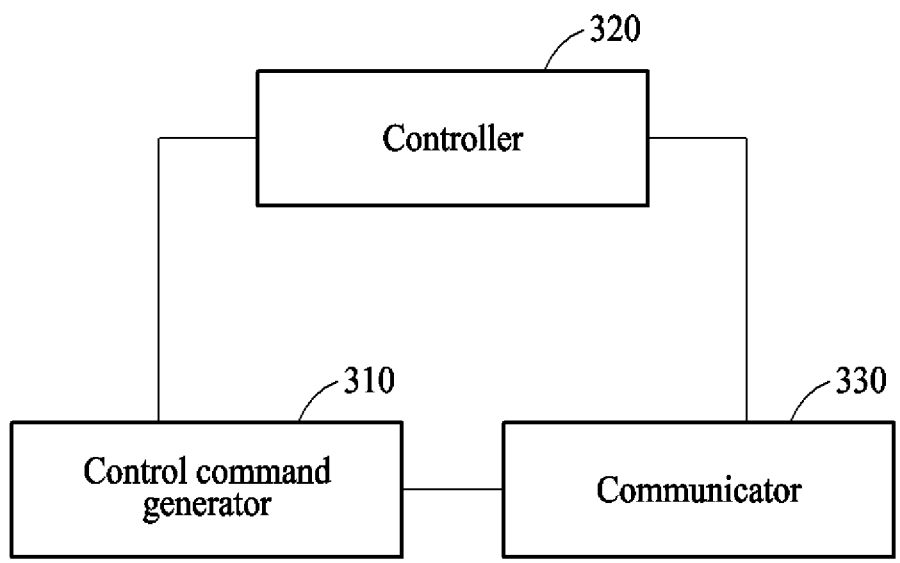
FIG. 3 is a drawing illustrating a configuration of a remote application server according to an embodiment.

FIG. 3 is a drawing illustrating a configuration of a remote application server according to an embodiment.

Referring to FIG. 3, a remote application server 300 includes a control command generator 310, a controller 320, and a communicator 330. Meanwhile, the remote application server 300 and the remote application server 100 illustrated in FIG. 1 may perform the same function.

The control command generator 310 generates a control command to configure a UI screen displayed on a subscriber terminal device.

The control command generator 310, when a template of a UI element included in a UI screen is repeatedly used, generates the first control command including description information on the template.

The controller 320 controls the control command generator 310 to generate the second control command including a replication command for the template and information on a UI resource to be applied to the UI element.

Figure 4:
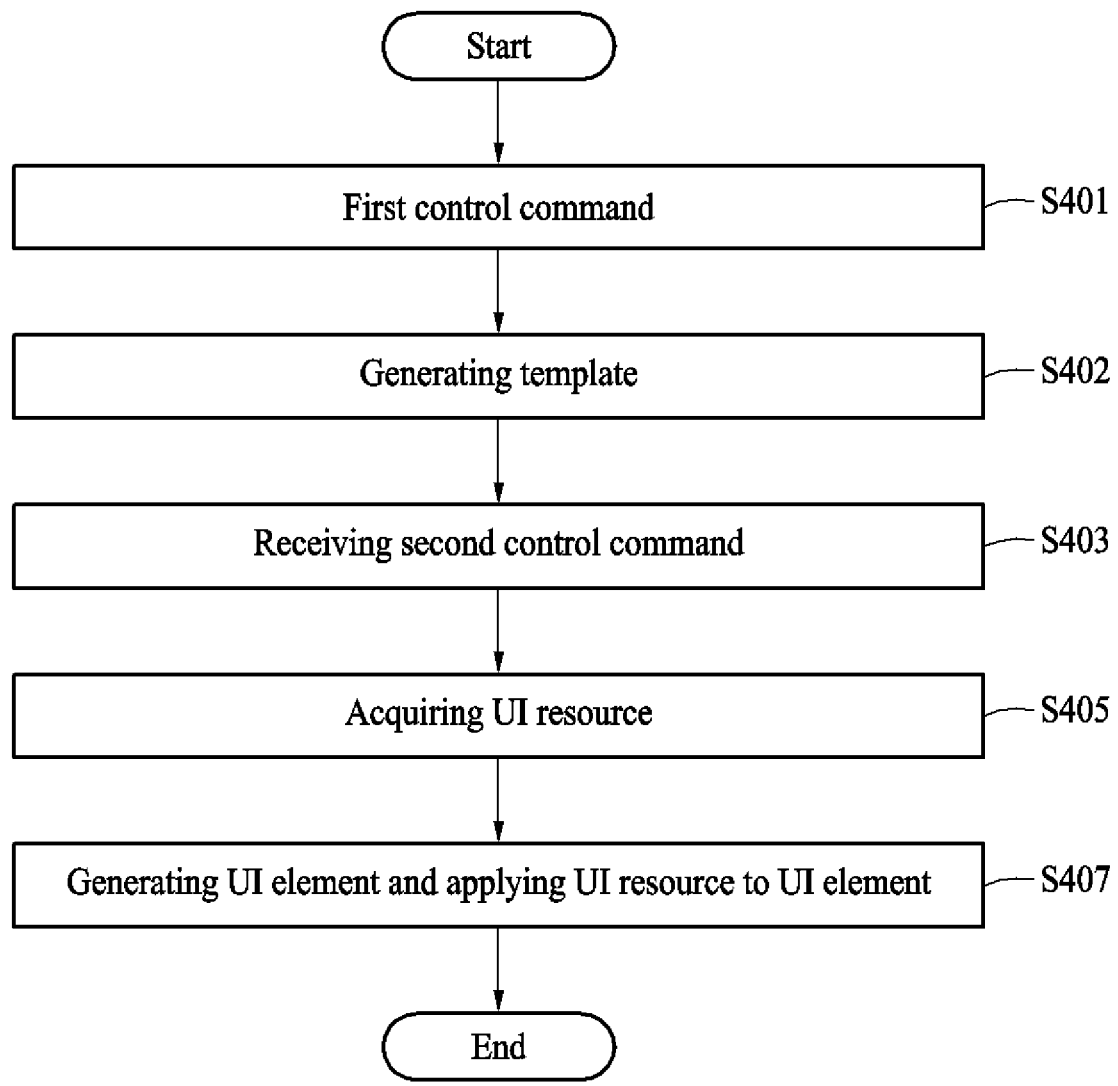
FIG. 4 is a flowchart illustrating a method of providing UIs of a subscriber terminal device in a cloud-based UI provision system according to an embodiment.

FIG. 4 is a flowchart illustrating a method of providing UIs of a subscriber terminal device in a cloud-based UI provision system according to an embodiment.

The method illustrated in FIG. 4 may be performed by the subscriber terminal device 210.

In S401, a subscriber terminal device receives a first control command including description information on a template repeated in a UI screen from a remote application server.

In S402, a subscriber terminal device generates a template based on the description information of the template repeated.

In S403, the subscriber terminal device receives a second control command including a replication command for the template.

In S405, the subscriber terminal device acquires a UI resource applied to a UI element based on the second control command.

In S407, the subscriber terminal device generates a UI element based on template replication and applies the UI resource to the UI element.

Figure 5:
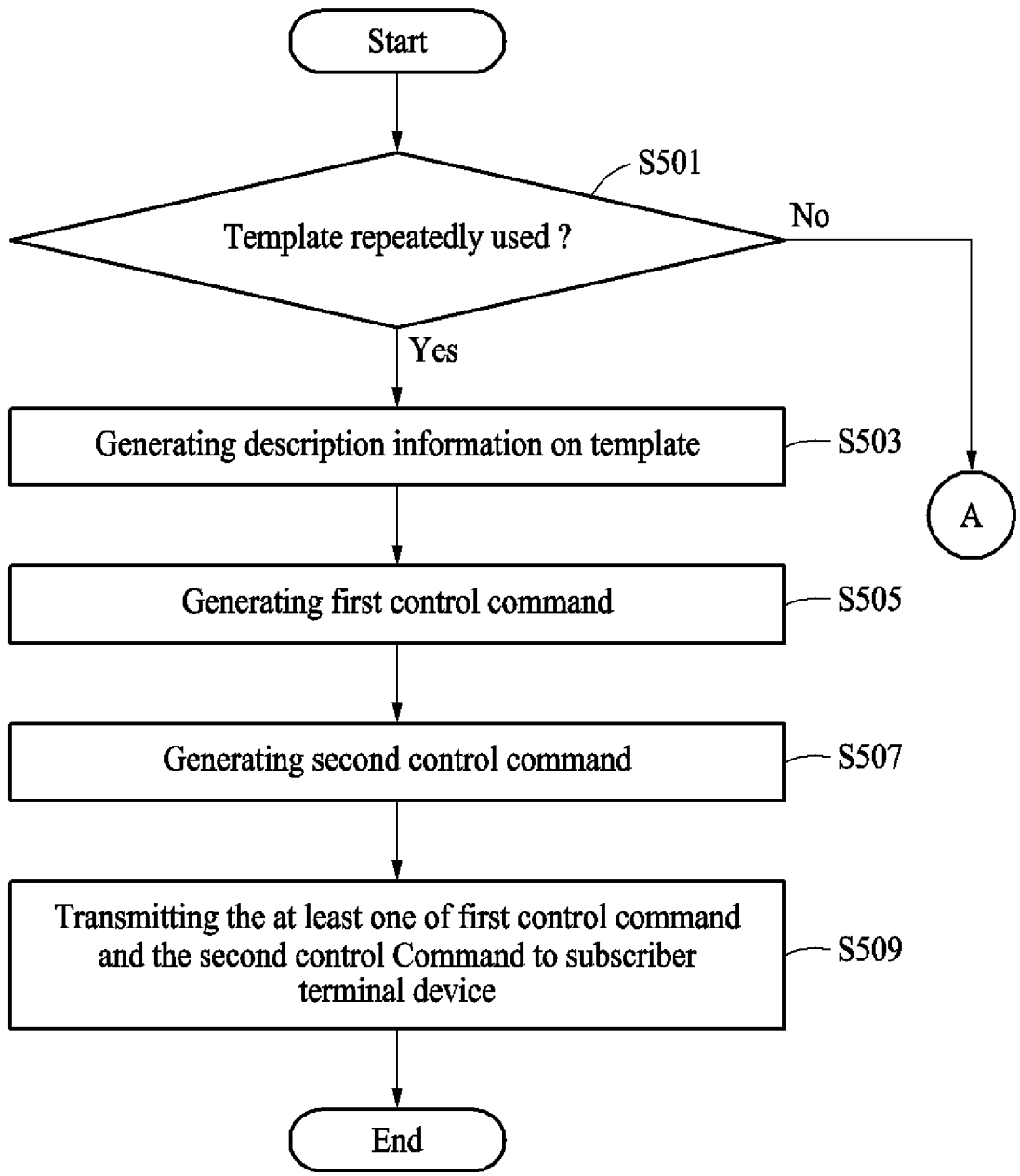
FIG. 5 is a flowchart illustrating a method of providing UIs of a remote application server in a cloud-based UI provision system according to an embodiment.

FIG. 5 is a flowchart illustrating a method of providing UIs of a remote application server in a cloud-based UI provision system according to an embodiment.

The method illustrated in FIG. 5 may be performed through the remote application server 300.

In S501, a remote application server determines whether a template of a UI element included in a UI screen is repeatedly used in a subscriber terminal device. When use of the template is not repeated, the remote application server may perform process "A." Here, process "A" may include a process of generating a control command excluding description information on the template and transmitting the control command to a subscriber terminal device.

When the template of the UI element is repeatedly used, the remote application server generates description information on the template in S503.

In S505, the remote application server generates a first control command including a template generation command and the description information on the template.

In S507, the remote application server generates a second control command including a replication command for the template and information on a UI resource to be applied to the UI element.

In S509, the remote application server transmits at least one of the first control command and the second control command to the subscriber terminal device.

FIG. 6 illustrates an embodiment of a UI screen displayed on a display device to describe a method of providing UIs according to an embodiment.

Referring to FIG. 6, a UI screen 600 may include a plurality of UI elements 601, 610, 620, 630, 640, 650, 661, 663, 665, and 667.

For example, the UI element 601 may represent a subject of the UI screen 600, and may include, for example, text such as "Movie," "Drama," or "Live program."

The UI element 610 may be a background of the UI screen 600, and description information on the UI element 610 may include information on sizes of template components, positions of template components, attributes of a UI resource, and the like.

Referring to FIG. 6, it can be confirmed that the UI elements 630, 640, and 650 having the same format as the first UI element 620 are repeatedly disposed on the UI screen 600.

The remote application server may generate description information on the first UI element 620 included in a control command as shown in [Table 1] below:

TABLE 1

CREATE Component as C1
SET Size of C1 200x400
SET Background of C1 7f7f7f33
CREATE Image as I1
SET Size of I1 198x298
SET of Position I1 1,1
SET URL of I1 "http://server/movie1_poster.jpg"
ADD I1 to C1 as poster
CREATE Text as T1
SET Size of T1 198x98
SET Position of T1 1,301
SET Text of T1 "Movie1"
ADD T1 to C1 as title Here, "CREATE Component as C1" may be description information to generate the first UI element 620.

"SET Size of C1 200×400" may be description information on a size of the first UI element 620, and "SET Background of C1 7f7f7f33" may be description information designating a color of a background of the first UI element 620.

"CREATE Image as I1" is description information on generation of an image disposed on the first UI element 620, "SET Size of I1 198×298" is description information on a size of the image, and "SET of Position I1 1,1" represents description information on a disposed position.

SET URL of I1 "http://server/movieposter.jpg" represents address information on a UI resource storage in which an image is stored. For example, the UI resource acquirer 215 of FIG. 2 may acquire the image from "http://server/movie1_poster.jpg," and may transfer the acquired image to a renderer 217.

"ADD I1 to C1 as poster" may be description information to add image I1 to the first UI element 620 as a poster image.

Text 1 625 may be generated by "CREATE Text as T1," and description information may include "SET Size of T1 198×98", "SET Position of T1 1,301", "SET Text of T1

'Movie1,' and "ADD T1 to C1 as title" respectively designating a size, position, kind, and attribute of Text 1 625.

The remote application server may generate a second control command including a replication command of description information on the first UI element 620 so as to transmit a control command for generation of a UI element repeated on a UI screen to a subscriber terminal device.

Here, the subscriber terminal device may replicate 621 and 623 corresponding to a format of the first UI element so as to generate reference symbols 631 and 633 included in the second UI element 630, and then may apply icon 2 (637), Text 2, and poster image 2 to the replicated format. Here, poster image 2 may be disposed in reference symbol 633.

As such, since the subscriber terminal device might not repeat a routine for generating the second UI element 630 through a process of replicating a format of the previously generated first UI element, UIs may be more rapidly and efficiently configured.

Meanwhile, the remote application server may designate description information on a repeated template as a template, and may generate a control command to use description information on first to fourth UI elements as a template.

Here, description information included in the control command may be generated, for example, as shown in [Table 2] below:

TABLE 2

```
<1>START Template E1
    CREATE Component as C1
    SET Size of C1 200x400
    SET Background of C1 7f7f7f33
    CREATE Image as I1
    SET Size of I1 198x298
    SET of Position I1 1,1
    ADD I1 to C1 as poster
    CREATE Text as T1
    SET Size of T1 198x98
    SET Position of T1 1,301
    ADD T1 to C1 as title
<13>END Template
    CREATE Root as R1
<17>INSTATIATE Template E1 as C2
    SET Text of C2.title "Movie1"
    SET URL of C2.poster "http://server/movie1_poster.jpg"
    SET Position of C2 0,0
<21>ADD C2 to R1 as p1
```

In [Table 2], <1> to <13> are description information representing a template to be replicated, and <17> to <21> may be description information generating a UI element of any one of the first to fourth UI elements 620 to 640 based on the template.

Referring to [Table 2] again, the first control command may include description information on a template described in <1> to <13>.

Here, the description information on the template may include information on a size, a background, image attributes, and the like.

The subscriber terminal device may generate a template 670 based on the description information on the template, and may generate UI elements 620, 630, 640, and 650 having the same template by replicating the template 670.

For example, the template generator 219 illustrated in FIG. 2 may generate the template 670 based on the description information on the template.

For example, in [Table 2], "SET Size of C1 200x400" may be a size of component 1 of a template, "SET of Position I1 1,1" may be a position of component 1 of a template, and "ADD I1 to C1 as poster" may be information designating a UI resource attribute of component 1 of a template.

In addition, the second control command may include "INSTATIATE Template E1 as C2," as a replication command for the template, and "http://server/movie1_poster.jpg," as UI resource information.

Meanwhile, referring to the UI screen 600 illustrated in FIG. 6, the UI elements 661, 663, 665, and 667 having the same template may be generated according to the embodiment described with reference to FIGS. 3 to 6.

As apparent from the above description, in accordance with an embodiment, system efficiency may be improved by reducing a communication message transmitted and received between a remote application server and a subscriber terminal in a cloud-based user interface provision system.

In accordance with an embodiment, delay in generating a UI screen may be reduced and user convenience may be improved by efficiently controlling UI configuration-related information transmitted and received between a remote application server and a subscriber terminal device in a cloud-based UI provision system.

The device described above may be implemented as a hardware component, a software component, and/or a combination of hardware components and software components. For example, the device and components described in the embodiments may be implemented using one or more general-purpose computers or special-purpose computers, such as, for example, a processor, a controller, an arithmetic logic unit (ALU), a digital signal processor, a microcomputer, a field programmable array (FPA), a programmable logic unit (PLU), a microprocessor, or any other devices capable of executing and responding to instructions. The processing device may execute an operating system (OS) and one or more software applications running on the operating system. In addition, the processing device may access, store, manipulate, process, and generate data in response to execution of the software. For ease of understanding, the processing device may be described as being used singly, but those skilled in the art will recognize that the processing device may include a plurality of processing elements and a plurality of processing element types. For example, the processing device may include a plurality of processors or one processor and one controller. Other processing configurations, such as a parallel processor, are also possible.

Software may comprise a computer program, code, instructions, or a combination of one or more thereof, and may configure a processing device to operate as desired or may independently or collectively command to a processing device. Software and/or data may be permanently or temporarily embodied by any machine type, a component, a physical device, virtual equipment, computer storage media, a device, or a transmitted signal wave so as to be interpreted by a processing unit or be provided to the processing unit. Software may be distributed over a networked computer system and stored or executed in a distributed manner. Software and data may be stored on one or more computer readable recording media.

Embodiments of the present invention can include a computer readable medium including program commands for executing operations implemented through various computers. The computer readable medium can store program commands, data files, data structures or combinations thereof. The program commands recorded in the medium may be specially designed and configured for the present invention or be known to those skilled in the field of computer software. Examples of a computer readable recording medium include magnetic media such as hard disks, floppy disks and magnetic tapes, optical media such as CD-ROMs and DVDs, magneto-optical media such as floptical disks, or hardware devices such as ROMs, RAMs and flash memories, which are specially configured to store and execute program commands. Examples of the program commands include a machine language code created by a compiler and a high-level language code executable by a computer using an interpreter and the like. The hardware devices may be configured to operate as one or more software modules to perform the operations of the embodiments, and vice versa.

Although the present invention has been described through limited embodiments and figures, the present invention is not intended to be limited to the embodiments. Those skilled in the art will appreciate that various modifications, additions and substitutions are possible, without departing from the scope and spirit of the invention. For example, although the described techniques are performed in a different order from the described method, and/or constituents, such as the described systems, structures, devices, and circuits, are combined in different manners and forms from the described method or substituted or replaced by other constituents or equivalents, appropriate results can be achieved.

It should be understood, therefore, that there is no intent to limit the invention to the embodiments disclosed, rather, the invention is to cover all modifications, equivalents, and alternatives falling within the spirit and scope of the invention as defined by the claims.

What is claimed is:

1. A subscriber terminal device, comprising:
   a control command receiver configured to receive a first control command including description information on a template repeated on a UI (User Interface) screen and a second control command including a replication command for the template from a remote application server;
   a template generator configured to generate a template based on the description information on the template repeated on the UI screen;
   a UI resource acquirer configured to acquire a UI resource based on the second control command;
   a UI element generator configured to generate UI elements based on replication of the template and apply the UI resource to the UI elements,
   wherein the second control command includes information on a number of the generated template when the template is repeated in the UI screen; and
   a controller that comprises at least one processor, wherein, when the control command receiver receives a third control command designating the template as a local UI, the control command receiver transfers the third control command to the controller, wherein the controller checks a memory allocated to the local UI and stores description information of the template in the memory when a memory capacity allocated to the local UI is equal to or larger than a predetermined value, wherein the controller transmits a return message to the remote application server when the memory capacity allocated to the local UI is smaller than the predetermined value.

2. The subscriber terminal device according to claim 1, wherein the second control command further comprises information on the number of the generated UI elements based on the replication of the template, a UI resource information applied to each of the UI elements when the number of the generated UI elements is plural, and screen coordinate information on each of the UI elements.

3. The subscriber terminal device according to claim 2, further comprising renderer configured to render the UI elements based on the screen coordinate information on each of the UI elements and provide a UI screen to a display device.

4. A remote application server, comprising:
   a control command generator configured to generate a control command for configuring a UI (User Interface) screen displayed on a subscriber terminal device;
   a controller configured to control generation of the control command; and
   a communicator configured to transmit the control command to the subscriber terminal device,
   wherein the control command generator, when a template of a UI element is repeatedly used in the UI screen, generates description information on the template,
   the control command generator generates a first control command comprising the description information on the template,
   the controller controls the control command generator to generate a second control command comprising a replication command for the template and information on a UI resource to be applied to the UI element,
   wherein the second control command includes information on a number of generated template when the template is repeated in the UI screen, and
   the controller further comprises at least one processor, wherein, when the control command generator generates a third control command designating the template as a local UI, the third control command is transferred to the controller, wherein the controller checks a memory allocated to the local UI and stores description information of the template in the memory when a memory capacity allocated to the local UI is equal to or larger than a predetermined value, wherein the controller transmits a return message to the remote application server when the memory capacity allocated to the local UI is smaller than the predetermined value.

5. The remote application server according to claim 4, wherein the second control command further comprises replication command for the template, information on a number of UI elements generated by the replication command of the template, a UI resource information applied to each of the UI elements when the number of the generated UI elements is plural, and screen coordinate information on each of the UI elements.

6. A method of providing UIs of a remote application server in a cloud-based UI provision system, the method comprising:
   determining whether a template of a UI element comprised in a UI screen is repeatedly used in a subscriber terminal device;
   generating description information on the template when the template is repeatedly used;
   generating a first control command comprising the description information on the template;
   generating a second control command comprising a replication command for the template and information on a UI resource to be applied to the UI element;
   transmitting the at least one of the first control command and the second control command to the subscriber terminal device, wherein the second control command includes information on a number of the generated template when the template of the UI element is repeatedly used in the UI screen;

generating a control command excluding the description information on a template of a UI element when the template is not repeatedly used in the subscriber terminal device; and transmitting the control command to the subscriber terminal device.

7. A computer program stored in a non-transitory computer readable recording medium to perform the method according to claim 6.

8. The subscriber terminal device according to claim 2, wherein the control command receiver receives a control command to configure UIs including description information of a UI element and configures UIs using the description information on the UI element and the UI resource information.

9. The subscriber terminal device according to claim 1, wherein the description information on the template comprises size of the template, position of the template, and attributes of the UI resource.

10. The remote application server according to claim 4, wherein the description information on the template comprises size of the template, position of the template, and attributes of the UI resource.

11. The remote application server according to claim 4, wherein the control command generator generates a first control command excluding description information on a template of a UI element when the template is not repeatedly used in the subscriber terminal device.

12. A method of claim 6, wherein the second control command further comprises information on the number of the generated UI elements based on the replication command, the UI resource information applied to each of the UI elements when the number of the generated UI elements is plural, and screen coordinate information on each of the UI elements.

13. A method of claim 6, wherein the description information on the template comprises size of the template, position of the template, and attributes of the UI resource.

\* \* \* \* \*